(12) United States Patent
Kitazono

(10) Patent No.: US 8,442,181 B2
(45) Date of Patent: May 14, 2013

(54) APPARATUS FOR INSPECTING AND TESTING STARTUP RANGE NEUTRON MONITORING SYSTEM

(75) Inventor: Hideyuki Kitazono, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/357,056

(22) Filed: Jan. 24, 2012

(65) Prior Publication Data

US 2012/0121054 A1    May 17, 2012

Related U.S. Application Data

(62) Division of application No. 12/136,356, filed on Jun. 10, 2008, now Pat. No. 8,116,421.

(30) Foreign Application Priority Data

Jun. 13, 2007 (JP) ................................. 2007-156183

(51) Int. Cl.
*G21C 17/00* (2006.01)
(52) U.S. Cl.
USPC ............ 376/259; 376/245; 376/254; 376/255
(58) Field of Classification Search .................. 376/245, 376/254, 255, 259
See application file for complete search history.

(56) References Cited

U.S. PATENT DOCUMENTS 6,181,761 B1 * 1/2001 Izumi et al. ................... 376/254
2010/0224788 A1 * 9/2010 Frank ....................... 250/390.04

FOREIGN PATENT DOCUMENTS

| JP | 60036980 A | * | 2/1985 |
| JP | 04-029085 | | 1/1992 |
| JP | 08-201526 | | 8/1996 |
| JP | 2002-111654 | | 4/2002 |

* cited by examiner

*Primary Examiner* — Jack W Keith
*Assistant Examiner* — Frank J McGue
(74) *Attorney, Agent, or Firm* — Oblon, Spivak, McClelland, Maier & Neustadt, L.L.P.

(57) ABSTRACT

An apparatus for inspecting and testing a startup range neutron monitoring system for a nuclear reactor. The apparatus includes: a neutron-flux detector; a preamplifier that amplifies an electric signal output from the neutron-flux detector; a pulse measurement unit that counts times when electric signal output from the preamplifier exceeds a discrimination voltage; a discrimination-voltage setting unit that applies the discrimination voltage to the pulse measurement unit; a voltage-setting unit that applies a voltage to the neutron-flux detector; an arithmetic processing unit that calculates an output power of the reactor based upon an output signal of the pulse measurement unit; an output unit that outputs data representing the output power of the reactor, calculated by the arithmetic processing unit; and an inspecting/testing unit that sets the discrimination voltage and the voltage to be applied by the voltage-setting unit.

9 Claims, 3 Drawing Sheets

APPARATUS FOR INSPECTING AND TESTING STARTUP RANGE NEUTRON MONITORING SYSTEM

CROSS REFERENCES TO RELATED APPLICATION

This application is a divisional of U.S. application Ser. No. 12/136,356, filed Jun. 10, 2008, and is based upon and claims the benefit of prior Japanese Patent Application No. 2007-156183, filed on Jun. 13, 2007, the entire contents of both of which are incorporated herein by reference.

BACKGROUND OF THE INVENTION

The present invention relates to a startup range neutron monitoring system for monitoring the output of a nuclear reactor at the time of starting up the nuclear reactor. More particularly, the invention relates to an apparatus for inspecting and testing the operating characteristic of a startup range neutron monitoring system.

FIG. 3 shows a conventional startup range neutron monitoring system. The startup range neutron monitoring system shown in FIG. 3 includes a startup range neutron monitor (SRNM) detector 1, an SRNM preamplifier 2, and a monitor 3. The SRNM detector 1 measures any neutron flux existing in the pressure vessel provided in a nuclear reactor. The SRNM preamplifier 2 receives the electric signal from the SRNM detector 1 and amplifies the signal. The monitor 3 receives the electric signal from the SRNM preamplifier 2 and acquires necessary information from the signals, thus monitoring the output power of the nuclear reactor.

The monitor 3 includes a pulse measurement unit 4, a Campbell measurement unit 5, a signal sorting unit 13, an arithmetic processing unit 6, a display unit 14, a diagnosis unit 15, an output unit 7, and a voltage setting unit 9. The pulse measurement unit 4 has discrimination-voltage setting unit 8 that sets voltage of a specific value. The pulse measurement unit 4 counts any pulse of a voltage higher than the voltage set by the discrimination-voltage setting unit 8. The Campbell measurement unit 5 measures the mean square value of pulsation at a frequency band of the electric signals output from the SRNM preamplifier 2. The signal sorting unit 13 sorts the electric signals from the SRNM preamplifier 2, some to the pulse measurement unit 4 and the others to the Campbell measurement unit 5. The arithmetic processing unit 6 calculates the output power of the nuclear reactor from the information supplied from the pulse measurement unit 4 and Campbell measurement unit 5. The display unit 14 displays the result of the calculation performed in the arithmetic processing unit 6. The diagnosis unit diagnoses the other components of the monitor 3, for abnormality, if any, developing in the other components. The output unit 7 outputs the result of the calculation performed in the arithmetic processing unit 6, to an external apparatus. The voltage-setting unit 9 sets a high voltage, which will be applied to the SRNM detector 1.

The arithmetic processing unit 6 has a CPU, which generates instructions. The unit 6 gives these instructions to the other components and collects data items from the other components, through a bus 16. The arithmetic processing unit 6 has a function of testing the characteristics of the startup range neutron monitoring system. The unit 6 determines, when necessary, the discrimination characteristic and Plateau characteristic of the startup range neutron monitoring system. This function is implemented by using software, as one of the various functions of the startup range neutron monitoring system.

A radiation sensor exhibits an output-current characteristic with respect to the voltage applied to it. The output-current characteristic is generally called Plateau characteristic. Further, the radiation sensor exhibits one neutron-pulse sensitivity when the radiation contains gamma rays, and another neutron-pulse sensitivity when the radiation contains no gamma rays. The sensitivity characteristic due to the gamma rays is known as discrimination characteristic. Startup range neutron monitoring systems of the type described above are disclosed in, for example, the following references: Japanese Patent Application Laid-Open Publication Nos. 04-29085, 08-201526 and 2002-111654, the entire contents of which are incorporated herein by reference.

In the conventional startup range neutron monitoring system described above, the arithmetic processing unit 6 determines the discrimination characteristic and Plateau characteristic based on the software installed in the monitor system. This software cannot be separated from the other arithmetic operation functions. Hence, even if a part of the software is altered, the whole monitor system must be tested for characteristics and be verified for reliability and safety.

If only those parts of the software, which describe the function of determining the discrimination characteristic and Plateau characteristic, fail to work, they may adversely influence all arithmetic operation functions the arithmetic processing unit performs, because they cannot be separated from the other arithmetic operation functions.

SUMMARY OF THE INVENTION

The present invention has been made to solve the problem specified above. An object of the invention is to provide an apparatus for inspecting and testing the operating characteristic of a startup range neutron monitoring system, which apparatus can determine the discrimination characteristic and Plateau characteristic of the system, without imposing any adverse influence on the arithmetic operation functions the arithmetic processing unit performs.

According to an aspect of the present invention, there is provided an apparatus for inspecting and testing a startup range neutron monitoring system, the apparatus comprising: a neutron-flux detector that detects neutron flux existing in a pressure vessel of a nuclear reactor; a preamplifier that amplifies an electric signal output from the neutron-flux detector; a pulse measurement unit that counts times when electric signal output from the preamplifier exceeds a discrimination voltage; a discrimination-voltage setting unit that applies the discrimination voltage to the pulse measurement unit; a voltage-setting unit that applies a voltage to the neutron-flux detector; an arithmetic processing unit that calculates an output power of the nuclear reactor based upon an output signal of the pulse measurement unit; an output unit that outputs data representing the output power of the nuclear reactor, calculated by the arithmetic processing unit; and an inspecting/testing unit that sets the discrimination voltage and the voltage to be applied by the voltage-setting unit.

According to another aspect of the present invention, there is provided an apparatus for inspecting and testing a startup range neutron monitoring system, the apparatus comprising: a neutron-flux detector that detects neutron flux existing in a pressure vessel of a nuclear reactor; a preamplifier that amplifies an electric signal output from the neutron-flux detector; a pulse measurement unit that counts times when electric signal output from the preamplifier exceeds a discrimination voltage; a Campbell measurement unit that measures mean square value of pulsation of the electric signal output from the preamplifier; a discrimination-voltage setting unit that applies the discrimination voltage to the pulse measurement unit; a voltage-setting unit that applies a voltage to the neutron-flux detector; an arithmetic processing unit that calculates an output power of the nuclear reactor based upon an output signal of the pulse measurement unit and an output of the Campbell measurement unit; an output unit that outputs data representing the output power of the nuclear reactor, calculated by the arithmetic processing unit; and an inspecting/testing unit that sets the discrimination voltage and the voltage to be applied by the voltage-setting unit.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Embodiments of a startup range neutron monitoring system inspecting and testing apparatus according to the present invention will be described with reference to the accompanying drawings.

First Embodiment

Figure 1:
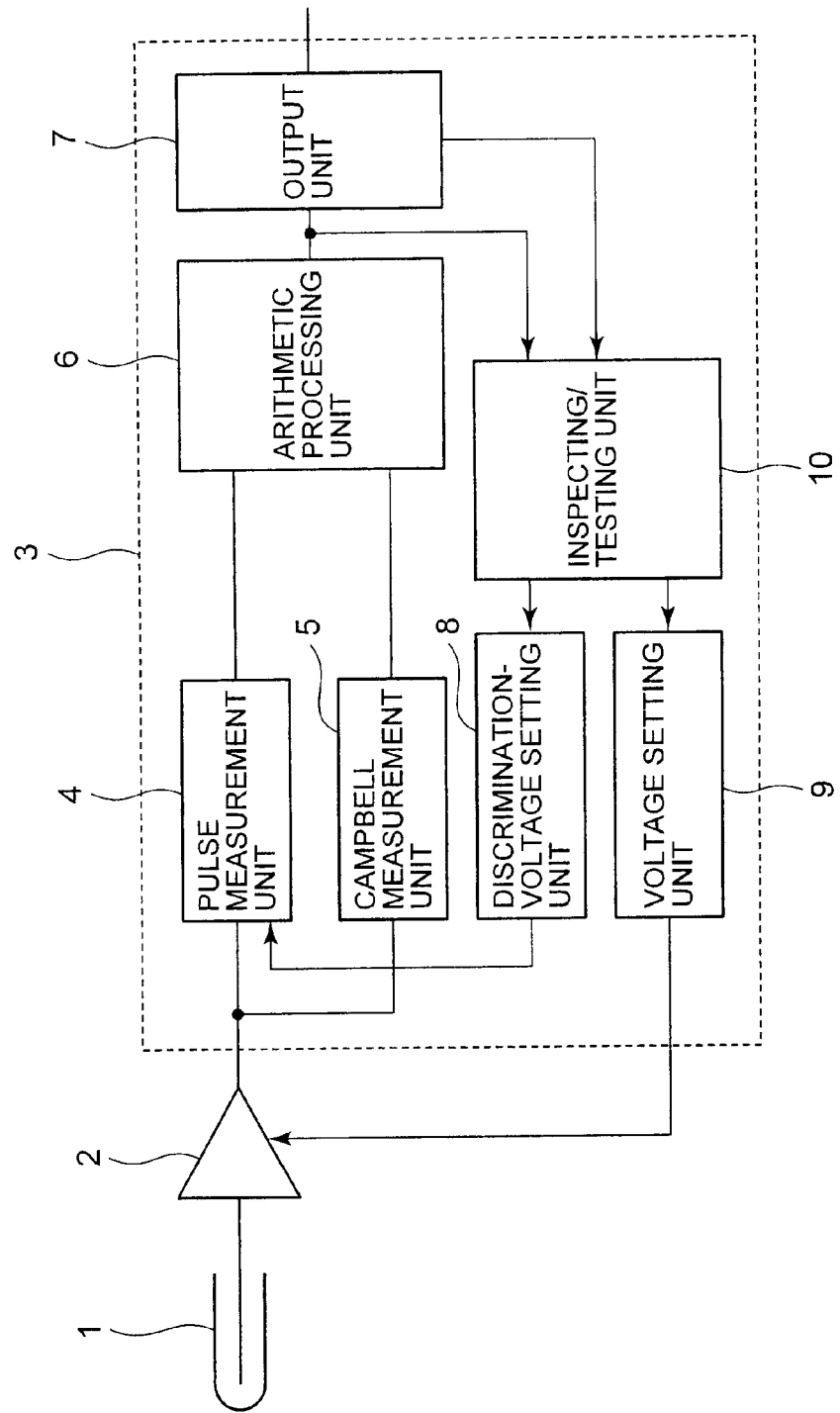
FIG. 1 is a block diagram showing a startup range neutron monitoring system inspecting and testing apparatus according to a first embodiment of the present invention.

A first embodiment according to the present invention will be described with reference to FIG. 1.

A startup range neutron monitoring system according to a first embodiment includes a startup range neutron monitor (SRNM) detector 1, an SRNM preamplifier 2, and a monitor 3. The SRNM detector 1 detects the neutron fluxes existing in the pressure vessel provided in a nuclear reactor. The SRNM preamplifier 2 receives electric signals from the SRNM detector 1 and amplifies the signals. The monitor 3 receives the electric signals from the SRNM preamplifier 2 and acquires necessary information from the signals, thus monitoring the output power of the nuclear reactor.

The monitor 3 includes a pulse measurement unit 4, a Campbell measurement unit 5, an arithmetic processing unit 6, an output unit 7, a discrimination-voltage setting unit 8, a voltage setting unit 9, and an inspecting/testing unit 10. The pulse measurement unit 4 counts any pulse of a voltage higher than a certain discrimination voltage set by the discrimination-voltage setting unit 8. The Campbell measurement unit 5 measures the mean square value of pulsation at a frequency band of the electric signals output from the SRNM preamplifier 2. The arithmetic processing unit 6 calculates the output power of the nuclear reactor from an output signal supplied from the pulse measurement unit 4 and Campbell measurement unit 5. The output unit 7 outputs the result of the calculation performed by the unit 6, to an external apparatus. The voltage-setting unit 9 sets a high voltage, which is applied to the SRNM detector 1. The inspecting/testing unit 10 can cause the discrimination-voltage setting unit 8 and voltage setting unit 9 to variably set a discrimination voltage and high voltage.

In the first embodiment configured as above, when the nuclear reactor is activated, it emits a neutron flux. The SRNM detector 1 determines the output power of the nuclear reactor, or the neutron flux in the reactor pressure vessel. The detection output of the SRNM detector 1 is supplied to the SRNM preamplifier 2.

The SRNM preamplifier 2 restricts the frequency band of the electric signal it has received from the SRNM detector 1. The SRNM preamplifier 2 then amplifies the electric signal, rectifies the waveform of the signal and supplies the signal to the pulse measurement unit 4 and the Campbell measurement unit 5.

When the nuclear reactor is activated, its output power is $10^{-9}$% to $10^{-4}$% of that of normal operation, and the output of the SRNM detector 1, i.e., the intensity of the neutron flux, is small in magnitude. In this case, the pulse measurement unit 4 compares the wave-height value of the electric signal supplied from the SRNM preamplifier 2 with the wave-height value set in the discrimination-voltage setting unit 8. The number at which the wave-height value of the electric signal becomes greater than the wave-height value set by the discrimination-voltage setting unit 8 is regarded as the number of pulses output from SRNM detector 1. The data representing the number of pulses is supplied to the arithmetic processing unit 6.

The arithmetic processing unit 6 converts the number of pulses to an output power level of the nuclear reactor, thus evaluating the output power the reactor produces during a low-power operation of the nuclear reactor. The value of the output power thus evaluated is supplied to the output unit 7.

While the nuclear reactor is operating, generating an output power of $10^{-5}$% to 10% of normal operation, the output of the SRNM detector 1, i.e., the intensity of the neutron flux, is large. In this case, the Campbell measurement unit 5 performs a Campbell measurement based on the so-called Campbell, determining the power of a component that fluctuates due to the output pulses that overlap one another in the output of the SRNM detector 1. Thus, the unit 5 calculates the square mean value of pulsation at a restricted frequency band of the electric signals output from the SRNM detector 1. The square means value thus calculated is supplied to the arithmetic processing unit 6.

The arithmetic processing unit 6 converts the square mean value of the measured output pulses to the output power of the nuclear reactor and then evaluates the output power of the reactor. The result of the evaluation is supplied to the output unit 7. The arithmetic processing unit 6 keeps monitoring and evaluating the output the nuclear reactor produces, at least throughout the startup phase.

A certain voltage set by the voltage setting unit 9 is applied to the SRNM detector 1 through the SRNM preamplifier 2 so as to detect the neutron flux.

The function and operation mode of the inspecting/testing unit 10 will be described.

To determine the discrimination characteristic, the inspecting/testing unit 10 causes the discrimination-voltage setting unit 8 to automatically set different voltages (equivalent to wave-height values) sequentially at regular time intervals, one being higher or lower than the previously set voltage by a specific value. The inspecting/testing unit 10 determines the wave-height distribution characteristic of the electric signal input to the monitor 3, from the output power of the nuclear reactor, which has been so evaluated as described above.

To determine the Plateau characteristic, the inspecting/testing unit 10 causes the SRNM detector 1 to automatically set different high voltages sequentially at regular time intervals, one being higher or lower than the previously set voltage by a specific value. The inspecting/testing unit 10 determines the Plateau characteristic of the electric signal input to the monitor 3, from the output power of the nuclear reactor, which has been evaluated as described above.

The inspecting/testing unit 10 is designed to arbitrarily set a voltage range of voltages, voltage intervals, and time intervals at which the voltages are applied, for the voltage the discrimination-voltage setting unit 8 sets or for the high voltage the voltage setting unit 9 sets.

The inspecting/testing unit 10 has the function of storing parameters, the data being processed, and the evaluated output power of the nuclear reactor, all supplied from the arithmetic processing unit 6 and output unit 7, so that the parameters, data and output may be used for calculations.

In the first embodiment, the inspecting/testing function of determining the discrimination characteristic and the Plateau characteristic is separately provided from the function of performing arithmetic operations, such as the arithmetic processing unit 6. Hence, the startup range neutron monitoring system can be tested and inspected, without imposing any adverse influence on the function of performing arithmetic operations. Thus, the monitoring system can be efficiently verified for reliability and safety.

Moreover, abnormality, if any, generated in the inspecting/testing unit 10 imposes no adverse influences on the function of performing arithmetic operations performed in the startup range neutron monitoring system. The output power of the nuclear reactor can therefore be monitored and evaluated continuously and reliably.

The inspecting/testing unit 10 need not operate as long as the output power of the nuclear reactor is sequentially monitored and evaluated. The unit 10 needs to operate only when the discrimination characteristic or Plateau characteristic of the electric signal input must be determined. Therefore, the inspecting/testing unit 10 may be shared by, usually six to ten startup range neutron monitors in most, used in the system. This helps to save cost and to reduce the probability of failure.

In addition, the inspecting/testing unit 10 can apply, to the discrimination-voltage setting unit 8, a discrimination voltage optimal for measuring the intensity of any neutron flux correctly, based on the wave-height distribution that represents the relation between the preset discrimination voltage and the evaluated output power of the nuclear reactor.

Since the inspecting/testing unit 10 has the function of saving the any data being processed, it can easily perform both verification and analysis.

Second Embodiment

Figure 2:
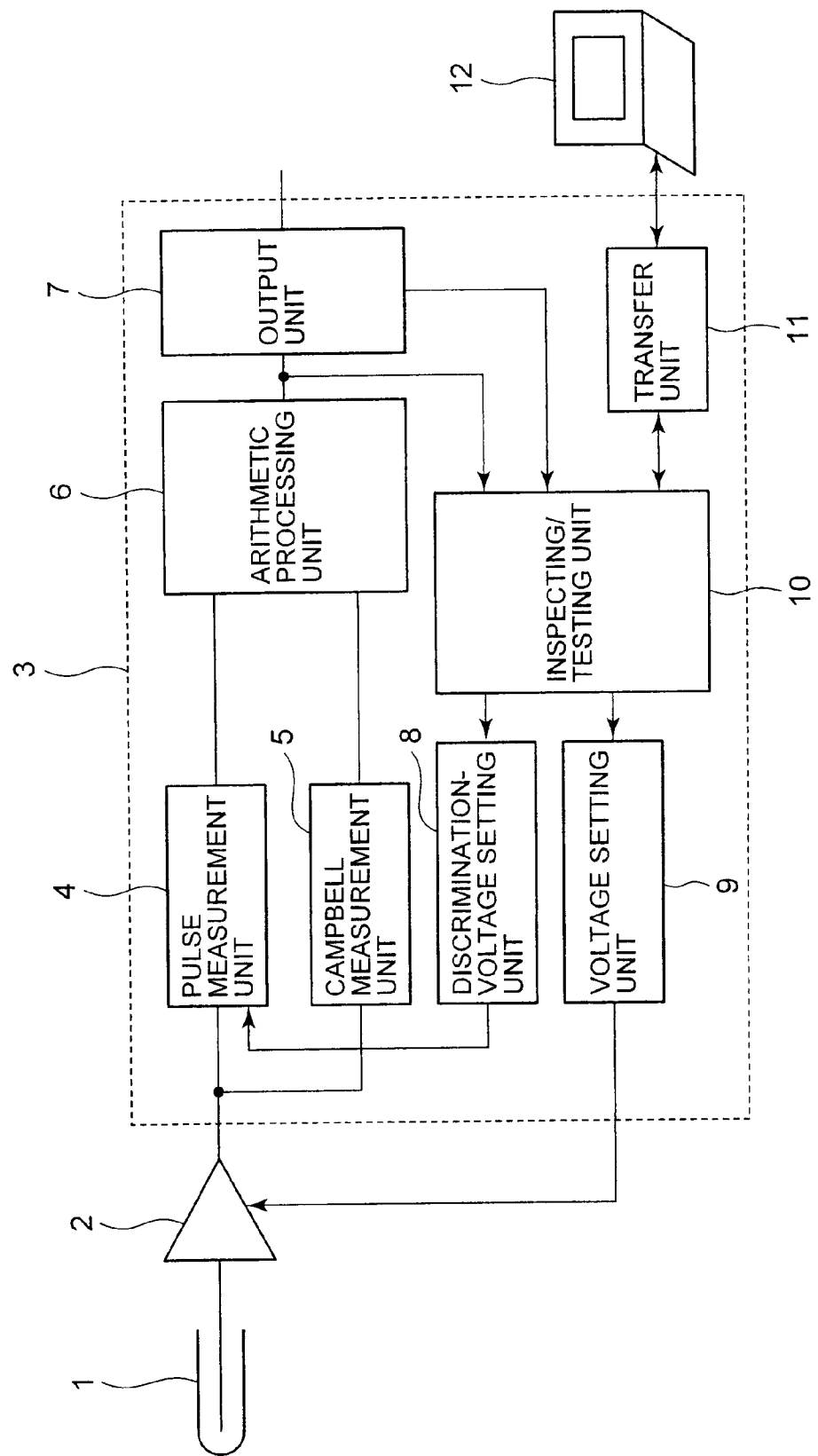
FIG. 2 is a block diagram showing an a startup range neutron monitoring system inspecting and testing apparatus according to a second embodiment of the present invention.
Figure 3:
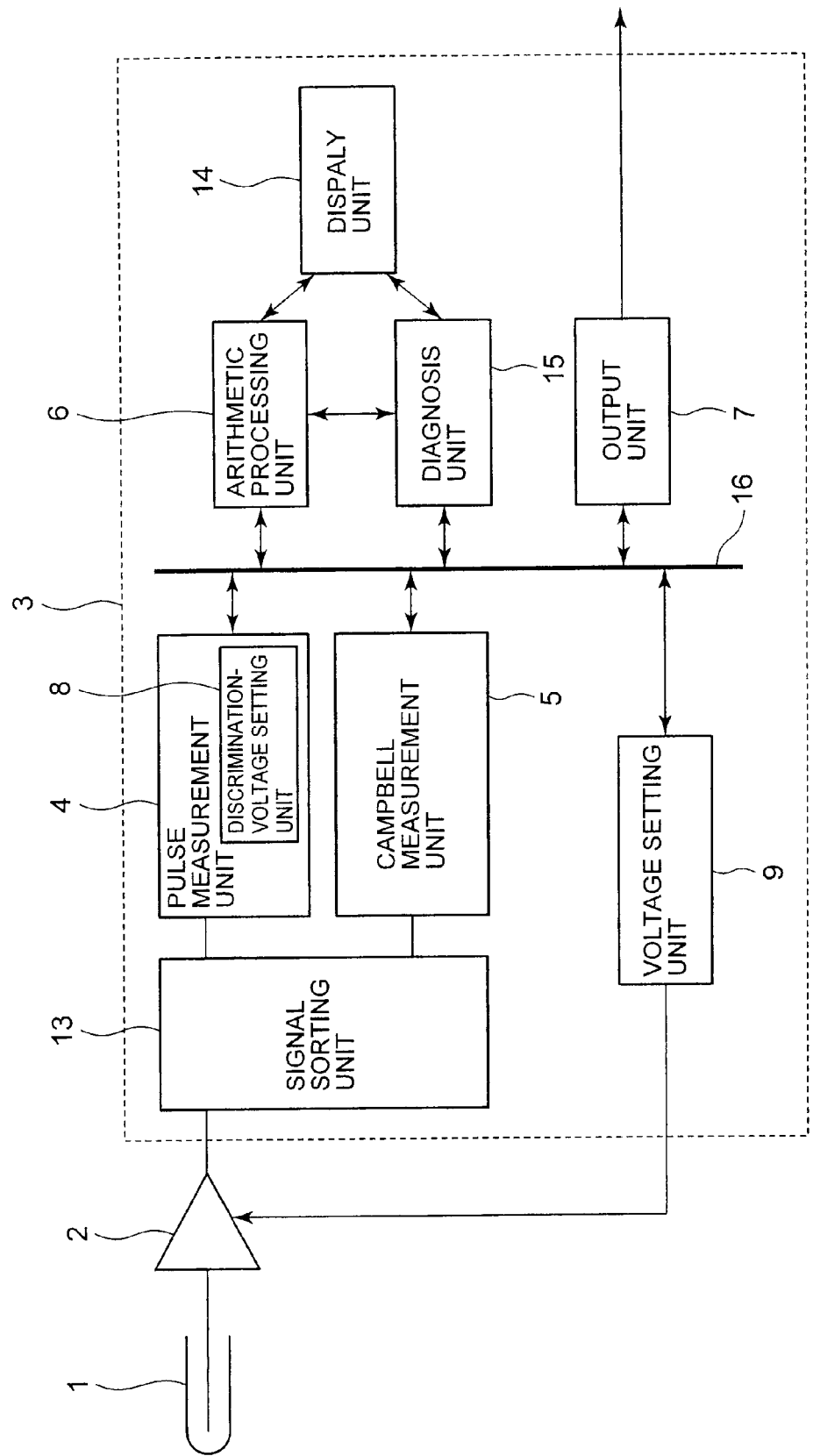
FIG. 3 is a block diagram showing a conventional startup range neutron monitoring system.

A second embodiment of a startup range neutron monitoring system inspecting and testing apparatus according to the present invention will be described with reference to FIG. 2. The components identical or similar to those of the first embodiment are designated by the same reference numbers and will not be described here.

The startup range neutron monitoring system inspecting and testing apparatus according to the present invention differs in configuration from the apparatus according to the first embodiment, in that a transfer unit 11 and a personal computer 12 are provided in addition the other components. The transfer unit 11 is provided to transfer data to an external apparatus. The personal computer 12 is connected to the transfer unit 11.

In the second embodiment thus configured, the personal computer 12 controls the inspecting/testing unit 10 in order to determine discrimination characteristic. When controlled by the personal computer 12, the unit 10 causes the discrimination-voltage setting unit 8 to automatically set different voltages (equivalent to wave-height values) sequentially at regular time intervals, one being higher or lower than the previously set voltage by a specific value. The personal computer 12 determines the wave-height distribution of the electric signal input to the monitor 3, from the output power of the nuclear reactor, which has been evaluated. Further, the personal computer 12 displays the wave-height distribution and saves the data representing this distribution.

To determine the Plateau characteristic, the personal computer 12 controls the inspecting/testing unit 10. When controlled by the personal computer 12, the unit 10 causes the SRNM detector 1 to automatically set different voltages sequentially at regular time intervals, one being higher or lower than the previously set voltage by a specific value. The personal computer 12 determines the Plateau characteristic of the electric signal input to the monitor 3 from the output power of the nuclear reactor, which has been evaluated. Further, the personal computer 12 displays the Plateau characteristic and saves the data representing this characteristic.

The transfer unit 11 converts the signals coming from the personal computer 12 to the signals that will be supplied to the inspecting/testing unit 10. Thus, the transfer unit 11 insulates the signals coming from the personal computer 12, preventing them from adversely influencing any components of the monitor 3.

With the second embodiment, the software stored in the personal computer 12 can convert the discrimination characteristic and Plateau characteristic to graphic information. Moreover, the graphic information can be saved in the large-capacity memory such as a built-in hard disk. As a result, data can be acquired directly from the inspecting/testing unit 10, and no printers need to be connected to the monitor 3. Hence, the second embodiment can inspect and test the startup range neutron monitoring system more efficiently.

Through the use of the personal computer 12, the monitor 3 need not have a graphics function. Using a monitor having no complex functions, the present monitoring system can work for a long time.

Furthermore, the data being processed and the evaluated output power data of the nuclear reactor can be saved for a long time in the large-capacity memory such as a hard disk incorporated in the personal computer 12. This facilitates the verification and analysis of the evaluation trend of the reactor output power.

Other Embodiments

The embodiments explained above are merely examples, and the present invention is not restricted thereto. It is, therefore, to be understood that, within the scope of the appended claims, the present invention can be practiced in a manner other than as specifically described herein.

What is claimed is:

1. An apparatus for inspecting and testing a startup range neutron monitoring system, the apparatus comprising:
   a neutron-flux detector that detects neutron flux existing in a pressure vessel of a nuclear reactor;
   a preamplifier that amplifies an electric signal output from the neutron-flux detector;
   a pulse measurement unit that counts times when electric signal output from the preamplifier exceeds a discrimination voltage;
   a discrimination-voltage setting unit that applies the discrimination voltage to the pulse measurement unit;
   a voltage-setting unit that applies a voltage to the neutron-flux detector;

an arithmetic processing unit that calculates an output power of the nuclear reactor based upon an output signal of the pulse measurement unit;

an output unit that outputs data representing the output power of the nuclear reactor, calculated by the arithmetic processing unit; and an inspecting/testing unit that sets the discrimination voltage and the voltage to be applied by the voltage-setting unit.

2. The apparatus according to claim 1, wherein the inspecting/testing unit sets different voltages at regular time intervals.

3. The apparatus according to claim 2, wherein the inspecting/testing unit is configured to arbitrarily set a voltage range of voltages, voltage intervals, and time intervals at which the voltages are applied.

4. The apparatus according to claim 1, wherein the inspecting/testing unit has a function of storing parameters used for operations, supplied from the arithmetic processing unit or from the output unit, the data being processed, and the calculated output power of the nuclear reactor.

5. The apparatus according to claim 1, further comprising a transfer unit that is connected to a data terminal to receive and supply data from and to the inspecting/testing unit.

6. The apparatus according to claim 1, wherein:
the arithmetic processing unit calculates the output power of the nuclear reactor based upon the output signal of the pulse measurement unit during an activation period of nuclear reactor.

7. The apparatus according to claim 6, wherein:
the activation period of nuclear reactor corresponds to an output power of $10^{-9}\%$ to $10^{-4}\%$ of that of a normal operation of the nuclear reactor.

8. The apparatus according to claim 1, wherein:
the arithmetic processing unit calculates the output power of the nuclear reactor based upon the output signal of the pulse measurement unit during an activation period of nuclear reactor; and the arithmetic processing unit calculates the output power of the nuclear reactor based upon an output signal of a Campbell measurement unit during an operational period of nuclear reactor that follows the activation period.

9. The apparatus according to claim 8, wherein:
the activation period of nuclear reactor corresponds to an output power of $10^{-9}\%$ to $10^{-4}\%$ of that of a normal operation of the nuclear reactor; and the operational period of nuclear reactor corresponds to an output power of $10^{-5}\%$ to $10\%$ of that of the normal operation of the nuclear reactor.

* * * * *